(12) United States Patent
Ganesan

(10) Patent No.: US 10,447,566 B2
(45) Date of Patent: Oct. 15, 2019

(54) METHOD AND SYSTEM FOR DIAGNOSING PERFORMANCE OF IN-HOME NETWORK

(71) Applicant: Venkatasubramaniam Ganesan, Germantown, MD (US)

(72) Inventor: Venkatasubramaniam Ganesan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 213 days.

(21) Appl. No.: 15/161,918

(22) Filed: May 23, 2016

(65) Prior Publication Data

US 2017/0339040 A1 Nov. 23, 2017

(51) Int. Cl.
*H04L 12/26* (2006.01)
*H04L 12/66* (2006.01)
*H04B 7/185* (2006.01)
*H04L 29/08* (2006.01)
*H04L 12/24* (2006.01)
*H04L 12/28* (2006.01)

(52) U.S. Cl.
CPC ..... *H04L 43/0888* (2013.01); *H04B 7/18591* (2013.01); *H04L 12/2898* (2013.01); *H04L 12/66* (2013.01); *H04L 41/046* (2013.01); *H04L 43/0835* (2013.01); *H04L 43/0864* (2013.01); *H04L 43/50* (2013.01); *H04L 67/02* (2013.01)

(58) Field of Classification Search
CPC .......... G06F 2221/034; G06F 11/2294; H04L 2209/60; H04L 63/12; H04L 63/123; H04L 67/22; H04L 43/0888; H04L 43/50; H04L 47/10; H04L 43/028; H04L 47/822; H04L 43/0864; H04L 43/08; H04L 43/0852; H04L 43/0894; H04L 41/22; H04L 43/18; H04L 47/30; H04L 65/80; H04L 47/2416; G07F 9/026; A63F 2300/409; H04N 21/43615; H04N 5/91; G07C 5/0808
See application file for complete search history.

(56) References Cited

U.S. PATENT DOCUMENTS

| | | | | |
|---|---|---|---|---|
| 7,116,894 B1 * | 10/2006 | Chatterton | ............. | H04N 5/765 386/211 |
| 8,341,685 B2 * | 12/2012 | Mickle | ................ | H04L 41/5054 725/103 |
| 8,713,609 B2 * | 4/2014 | Ling | ...................... | H04N 21/43 725/54 |
| 9,391,834 B2 * | 7/2016 | Hwang | ................. | H04M 3/306 |
| 9,420,090 B2 * | 8/2016 | Mohseni | ............... | H04M 3/085 |
| 9,479,341 B2 * | 10/2016 | Bugenhagen | .......... | H04L 12/14 |

(Continued)

*Primary Examiner* — Sargon N Nano
(74) *Attorney, Agent, or Firm* — Capitol City Techlaw; Jasbir Singh

(57) ABSTRACT

A method and system for testing a Local Area Network (LAN) coupled to a satellite network through a Customer Premises Equipment (CPE) is disclosed. The method includes: providing a LAN diagnostics tool disposed on the CPE for executing a plurality of tests; receiving, at the LAN diagnostics tool, a test request comprising an execution environment indicator; selecting a test agent based on the execution environment indicator; sending in response to the test request, from the LAN diagnostics tool, the selected test agent; and testing the LAN with communications between the LAN diagnostics tool and the selected test agent being executed on a device connected to the LAN.

18 Claims, 3 Drawing Sheets

(56) References Cited

U.S. PATENT DOCUMENTS

| | | | | |
|---|---|---|---|---|
| 9,491,283 B2* | 11/2016 | Hwang | ................ | H04M 3/306 |
| 9,578,383 B2* | 2/2017 | Ling | .................... | H04N 21/43 |
| 9,699,506 B2* | 7/2017 | Mickle | ............... | H04N 21/4425 |
| 10,264,029 B2* | 4/2019 | Lajoie | ................ | H04L 65/1016 |
| 2002/0144187 A1* | 10/2002 | Morgan | ............. | G06F 11/0748 |
| | | | | 714/43 |
| 2002/0196460 A1* | 12/2002 | Parry | .................... | G06F 3/1267 |
| | | | | 358/1.15 |
| 2002/0199203 A1* | 12/2002 | Duffy | ............... | H04L 29/06027 |
| | | | | 725/109 |
| 2008/0084993 A1* | 4/2008 | Peddireddy | ............ | H04M 1/24 |
| | | | | 379/433.01 |
| 2009/0232008 A1* | 9/2009 | Wurst | .................... | H04L 41/26 |
| | | | | 370/245 |
| 2009/0328190 A1* | 12/2009 | Liu | ......................... | H04L 43/50 |
| | | | | 726/14 |
| 2010/0088398 A1* | 4/2010 | Plamondon | ............ | H04L 67/28 |
| | | | | 709/220 |
| 2011/0072312 A1* | 3/2011 | Fan | .................... | G06F 11/0748 |
| | | | | 714/46 |
| 2013/0078994 A1* | 3/2013 | Jouin | .................... | G06F 3/1438 |
| | | | | 455/426.1 |
| 2014/0280904 A1* | 9/2014 | Bugenhagen | ........... | H04L 43/50 |
| | | | | 709/224 |
| 2015/0242294 A1* | 8/2015 | Lapierre | ............... | G06F 11/079 |
| | | | | 714/37 |
| 2016/0147643 A1* | 5/2016 | Hamon | ............... | G06F 11/3664 |
| | | | | 717/134 |
| 2017/0164059 A1* | 6/2017 | Ling | .................... | H04N 21/4821 |
| 2017/0187878 A1* | 6/2017 | Clawson | ............. | H04M 3/5116 |

* cited by examiner

METHOD AND SYSTEM FOR DIAGNOSING PERFORMANCE OF IN-HOME NETWORK

FIELD

The present disclosure relates to a method and a system for network diagnostic tests to determine a cause of poor service performance for an Internet connection. In particular, the present disclosure provides a system and method for remotely measuring network metrics, such as, throughput performance, packet loss rate, latency and the like, between various network devices on the in-home network to determine a root cause of the performance issue.

BACKGROUND

An Internet Service Provider (ISP) may receive customer service calls complaining of poor service performance. Perceived poor performance may be a result of problems over the ISP transport, problems with the terrestrial internet hosts or networks being accessed, problems within the customer home network or equipment, or problems due to unrealistic customer expectations. Prior performance diagnostics tools deal primarily with WAN network connections, without specifically measuring performance of the LAN network.

Prior LAN diagnostics tools test only the throughput, and not the quality of the in-home connection. Moreover, prior LAN diagnostics tools do not store the prior test data for further analysis. In addition, prior LAN diagnostics tools do not have the ability for the user to annotate the test.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A method for testing a Local Area Network (LAN) coupled to a satellite network through a Customer Premises Equipment (CPE) is disclosed. The method includes: providing a LAN diagnostics tool disposed on the CPE for executing a plurality of tests; receiving, at the LAN diagnostics tool, a test request comprising an execution environment indicator; selecting a test agent based on the execution environment indicator; sending in response to the test request, from the LAN diagnostics tool, the selected test agent; and testing the LAN with communications between the LAN diagnostics tool and the selected test agent being executed on a device connected to the LAN.

A system to test a Local Area Network (LAN) coupled to a satellite network through a Customer Premises Equipment (CPE) is disclosed. The system includes: a LAN diagnostics tool disposed on the CPE for executing a plurality of tests; and a test request, received at the LAN diagnostics tool, comprising an execution environment indicator. In the system, the LAN diagnostics tool is configured to select a test agent based on the execution environment indicator, is configured to send the selected test agent, and is configured to test the LAN with communications between the LAN diagnostics tool and the selected test agent being executed on a device connected to the LAN.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
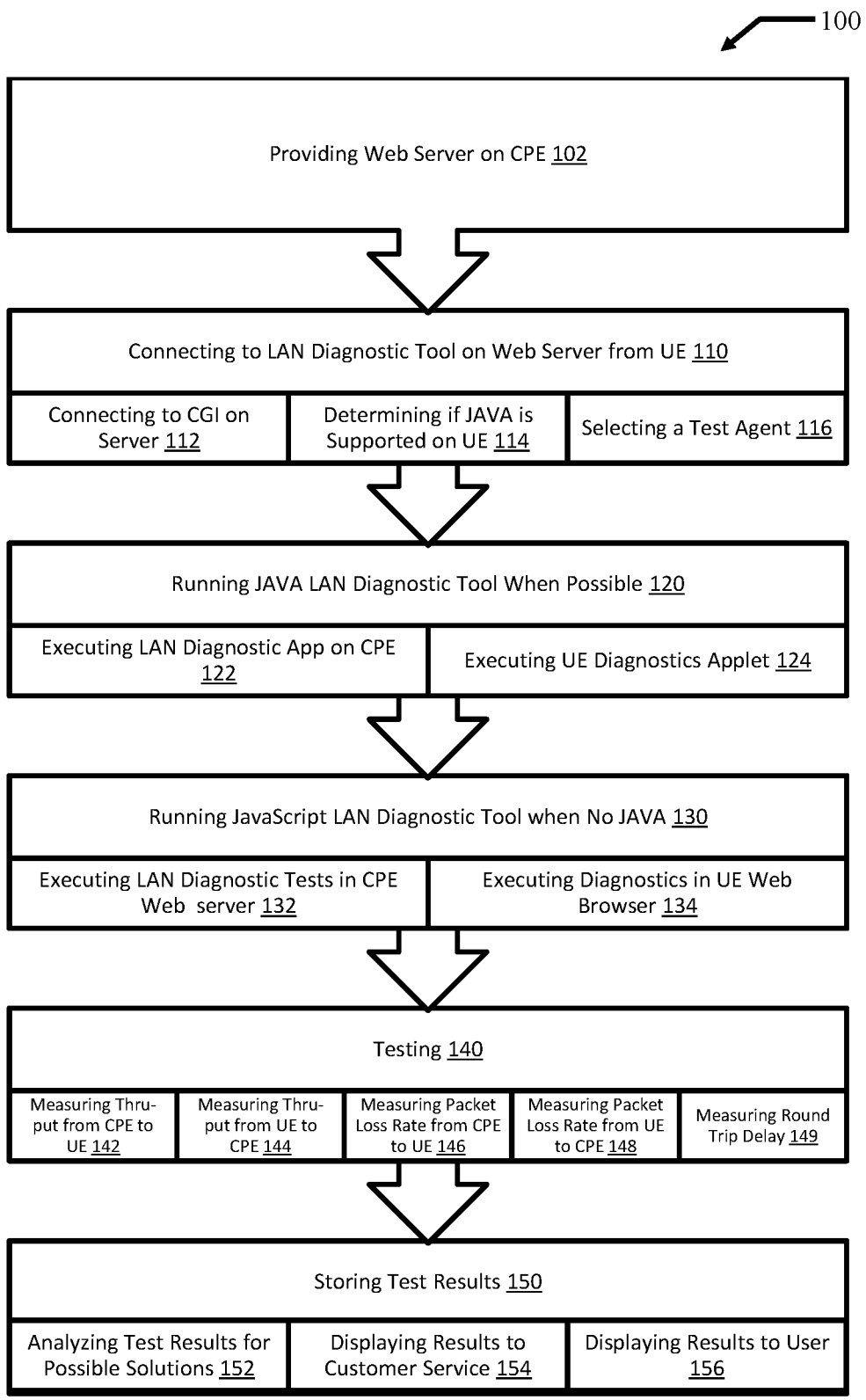
FIG. 1 illustrates a method for testing a network according to various embodiments.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

An Internet service provider (ISP) may need to perform in-home network diagnostic tests to determine a cause of network performance issues. The present teachings disclose running various diagnostics including:

Test the performance of an in-home network by measuring throughput from an ISP Customer Premises Equipment (CPE) to an end user device.

Test the performance of an in-home network by measuring throughput from the end user device to the ISP CPE.

Test the quality of the in-home wireless/wired network by measuring a packet loss rate from ISP CPE to the end user device.

Test the quality of the in-home wireless/wired network by measuring the packet loss rate from end user device to the ISP CPE.

Test the quality of the in-home wireless/wired network by measuring the round trip delay In exemplary embodiments, the ISP CPE may be a satellite modem.

In some embodiments, the present method may be run from any device on the network. In some embodiments, the present method may capture results and provide them to a remote customer service agent. In some embodiments, the present method may rate an in-home network quality based on historical and recent test results. In some embodiments, the present method may record and display current and past results. In some embodiments, the present method may allow an end user to annotate results with metadata on the test.

The present teachings provide a unique and integrated method to determine if performance problems are due to the customer home network or equipment, allowing the customer to make this diagnosis. In some embodiments, the diagnosis may be performed without calling the ISP customer service. In some embodiments, the method may enable a Customer Service Representative (CSR) to assist the customer to localize in-home problems. These abilities can improve customer satisfaction and reduce customer service costs.

The present teachings provide for establishing a network connection, for example, a TCP connection, between a diagnostics application running on an Internet Service Provider's (ISP's) Consumer Premises Equipment (CPE) and a client application running on a user's equipment. In exemplary embodiments, the ISP provides Internet service via a satellite or a High Altitude Platform (HAP). The connection is used to measure the in-home network quality and performance in order to diagnose network connectivity and throughput issues.

In exemplary embodiments, the diagnostics application automatically detects and determines if the user's equipment is capable of running the client application, for example, as a Java applet. In exemplary embodiments, the diagnostics application may offer a more ubiquitous client application execution environment, when a first client application execution environment is unavailable, for example, by using a JAVASCRIPT-based method when a JAVA-based execution environment is unavailable. The results of the diagnostics may be are recorded in a non-volatile storage of the ISP CPE. In exemplary embodiments, the results may be used for later analysis by an ISP representative, for example, a customer service representative.

The performance test maybe implemented using various technologies, for example, via JavaScript, via a JAVA applet or the like.

FIG. 1 illustrates a method for testing a network according to various embodiments.

In exemplary embodiments, a method 100 is provided. The method 100 includes a step 102 for providing a web server on a Customer Premises Equipment (CPE).

The method 100 further includes a step 110 for connecting to a LAN diagnostic tool hosted by the CPE web server from a User Equipment (UE). In exemplary embodiments, the method 100 further includes a step 112 for connecting the LAN diagnostic tool request to a Common Gateway Interface (CGI) script on the web server. In some embodiments, the web server can communicate with diagnostics services with interfaces other than CGI. In exemplary embodiments, the method 100 further includes a step 114 for determining if JAVA is supported on the UE. The step 114 may be performed via a script executed on the UE and the script's results are provided to the CPE web server. The method 100 further includes a step 116 for selecting a test agent to be sent to the UE based on the script's results.

In exemplary embodiments, the method 100 further includes a step 120 for running a JAVA version of the LAN diagnostic tool when possible. In these embodiments, the CGI or web server can select and provide a LAN diagnostics applet to the UE. In exemplary embodiments, the LAN diagnostics applet maybe a JAVA applet. The method 100 may further include a step 122 for executing a LAN diagnostic app on the CPE. Step 122 may be initiated in response to a user initiating a diagnostics request from a UE via the CPE web server. The method 100 also includes a step 124 for executing a LAN diagnostics applet on the UE.

In exemplary embodiments, the method 100 may include a step 130 for running a JavaScript LAN Diagnostic Tool on the UE, for example, when the UE does not support a correct version of JAVA. In these embodiments, the CGI or web server can select and provide a JavaScript LAN Diagnostic Tool as the test agent to the UE. The method 100 may further include a step 132 for executing the LAN diagnostic tests on the CPE web server. Step 132 may be initiated in response to a user initiating a diagnostics request from a UE via the CPE web server. The method 100 also includes a step 134 for executing LAN Diagnostics in a UE web browser.

The method 100 includes a step 140 for testing. The testing 140 may include a step 142 for measuring thru-put from CPE to UE. The testing 140 may include a step 144 for measuring thru-put from UE to CPE. The testing 140 may include a step 146 for measuring a packet loss rate from CPE to UE. The testing 140 may include a step 148 for measuring a packet loss rate from UE to CPE. The testing 140 may include a step 149 for measuring a round trip delay between the UE and CPE.

The method 100 includes a step 150 for storing test results. In exemplary embodiments, after storing test results at step 150, the method 100 can include a step 152 for analyzing the test results for possible solutions. The method 100 can include a step 154 for displaying the test results to customer service. The method 100 can include a step 156 for displaying the test results to a user. By displaying the test results to a user, a user can make an informed decision to remedy thru-put and latency issues in the local network prior to contacting an ISP's customer service center. By displaying the test results to a user, a customer service representative can provide verifiable information on whether the thru-put and/or latency issues are with the customer's network or with the ISP's network.

Embodiment 1—JAVA Armlet

When, for example, a JAVA applet is used to implement the present teachings, the JAVA may perform precise speed measurement by cutting down the connection establishment and teardown times for the various tests. Typically, a Customer Premises Equipment (CPE), such as a satellite modem, has a small memory and processor footprint, and as such small data files are used to test a connection speed. With the small data file sizes, the establishment and teardown times remain low in these devices.

Figure 2:
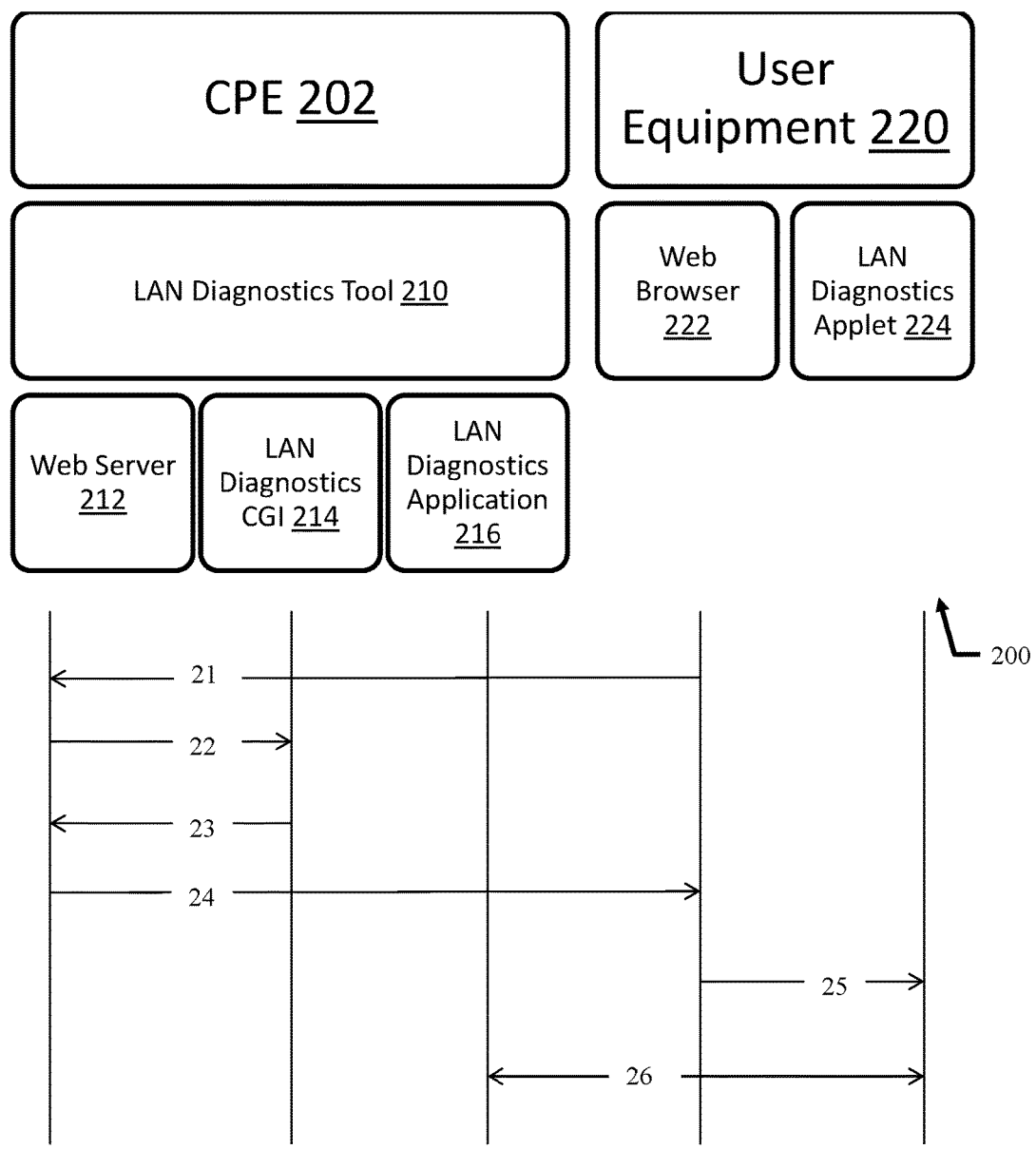
FIG. 2 illustrates a logical view of a network testing system including a Local Area Network (LAN) diagnostics tool, and an illustrative method to test a network according to various embodiments.

FIG. 2 illustrates a logical view of a network testing system including a Local Area Network (LAN) diagnostics tool, and an illustrative method to test a network according to various embodiments.

In FIG. 2, an arrow indicates a direction from an event initiator to an event actioner. The arrow may encapsulate multiple communications between the event initiator and the event actioner to perform the step or function associated with the event.

A network testing system 200 may be implemented using a Customer Premises Equipment (CPE) 202, where the CPE provides a gateway between a satellite-based communications network and a local area network. In exemplary embodiments, the CPE 202 may be a satellite modem. A Local Area Network (LAN) diagnostics tool 210 may be included with the CPE 202 and the CPE 202 may be networked with user equipment 220 over a LAN.

The LAN diagnostics tool 210 may automatically detect technical capabilities of the user equipment 220. For example, the LAN diagnostics tool 210 may detect and determine whether the user equipment 220 supports a correct technology and a version level, for example, a JAVA version. The LAN diagnostics test tool 210 may automatically detect whether the user equipment 220 has the necessary permissions and/or privileges to run a client application on a user device, for example, a JAVA applet. If so, the LAN diagnostics tool 210 performs testing of the network testing system 200 using the steps illustrated in FIG. 2, for example, with a JAVA applet.

The network testing system 200 may implement a method. The method may include a user equipment 220 initiating an event 21 via a request from a web browser 222 disposed in the user equipment 222. In exemplary embodiments, the user equipment 220 may include a personal computer, a mobile device, or the like. The CPE 202 receives event 21, processes event 21, and initiates the LAN Diagnostics test 210. Handling of the event 21 may be implemented via a web server 212, such as, a HTTP server. In response to the event 21, the web server 212 at the CPE spawns a LAN diagnostics Common Gateway Interface (CGI) 214 process at event 22. Per event 22, the LAN Diagnostics CGI 214 process sends out LAN Diagnostics applet to the requesting web browser 222 via the web server 212 at event 23. The Web browser 222 receives the applet code at event 24. The web browser 222 spawns the LAN diagnostics applet 224 as a separate process.

The LAN Diagnostics Java applet 224 establishes a network connection, for example, a TCP connection with the LAN diagnostics application 216 to perform the test. The LAN Diagnostics Java applet 224 sends the results of the tests to the LAN Diagnostics application 216 for storing a test result.

Embodiment 2—JavaScript

If the appropriate JAVA version is not installed or the required permission to run the JAVA applet is not given, then the LAN diagnostics tool 210 may automatically performs testing of the communication system 200 using the steps illustrated in FIG. 2, for example, with a JavaScript method embedded in the LAN Diagnostics web page to perform the LAN diagnostics.

Figure 3:
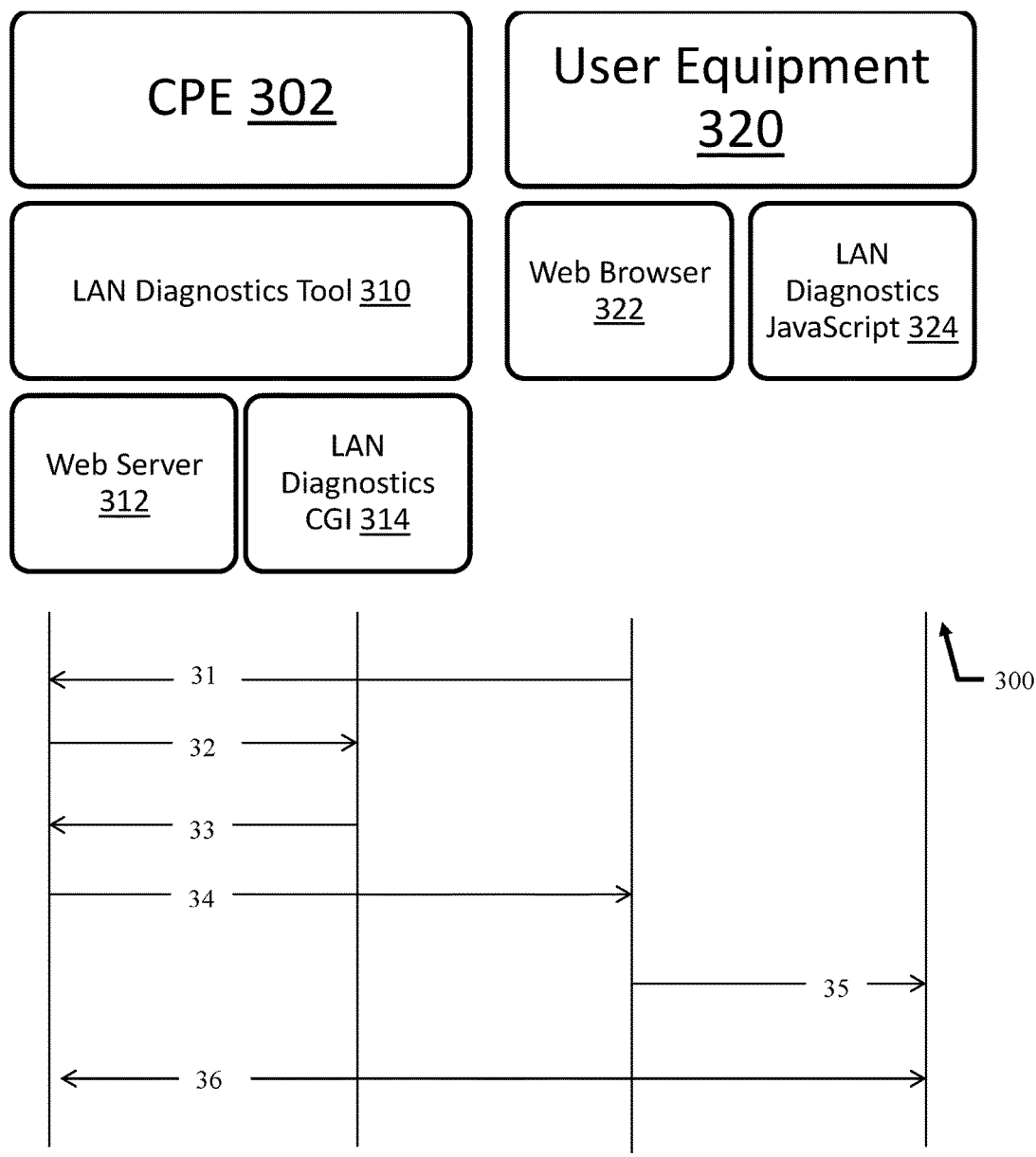
FIG. 3 illustrates a logical view of a network testing system including a Local Area Network (LAN) diagnostics tool, and an illustrative method to test a network according to various embodiments.

FIG. 3 illustrates a logical view of a network testing system including a Local Area Network (LAN) diagnostics tool, and an illustrative method to test a network according to various embodiments.

A network testing system 300 may be implemented using a Customer Premises Equipment (CPE) 302, where the CPE provides a gateway between a satellite-based communications network and a local area network. In exemplary embodiments, the CPE 302 may be a satellite modem. A Local Area Network (LAN) diagnostics tool 310 may be included with the CPE 302 and the CPE 302 may be networked with user equipment 320 over a LAN.

The LAN diagnostics tool 310 may automatically detect technical capabilities of the user equipment 320. The network testing system 300 may implement a method. The method may include a user equipment 320 initiating an event 31 via a request from a web browser 322 disposed in the user equipment 320. In exemplary embodiments, the user equipment 320 may include a personal computer, a mobile device, or the like. The CPE 302 receives event 31, processes event 31, and initiates the LAN Diagnostics test 310. Handling of the event 31 may be implemented via a web server 312, such as, a HTTP server.

In response to the event 31, the web server 312 at the CPE spawns a LAN diagnostics Common Gateway Interface (CGI) 314 process at event 32. In response to event 32, the LAN Diagnostics CGI 314 process sends out an HTML script including LAN Diagnostics JavaScript 324 to the requesting web browser 322 via the web server 312 at event 33. The web browser 322 receives the HTML script including the LAN Diagnostics JavaScript 324 at event 34. The web browser 322 executes the LAN Diagnostics JavaScript 324 within its process context. The LAN Diagnostics JavaScript 324 establishes a network connection, for example, a TCP connection with the LAN diagnostics CGI 314 to perform the testing. The LAN Diagnostics JavaScript 324 sends the results of the tests to the LAN Diagnostics CGI 314 for storing a test result.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim:

1. A method for testing a Local Area Network (LAN) coupled to a satellite network through a Customer Premises Equipment (CPE), the method comprising:
   providing a LAN diagnostics tool disposed on the CPE for executing a plurality of tests;
   sending, from the LAN diagnostics tool, a first script to determine an execution environment indicator;
   receiving, at the LAN diagnostics tool, a test request comprising an execution environment indicator;
   selecting, at the LAN diagnostics tool, a test agent comprising a second script based on the execution environment indicator;
   sending in response to the test request, from the LAN diagnostics tool, the selected test agent; and
   testing the LAN with communications between the LAN diagnostics tool and the selected test agent being executed, in an execution environment indicated by the execution environment indicator, on a device connected to the LAN, wherein the CPE couples the satellite network to the LAN, and the plurality of tests comprise measuring the thru-put from the CPE to the device, measuring the thru-put from the device to the CPE, measuring a packet loss rate from the CPE to the device, measuring a packet loss rate from the device to the CPE, and measuring a round trip delay between the CPE and the device.

2. The method of claim 1, wherein the CPE comprises a gateway between the satellite network and the LAN.

3. The method of claim 1, wherein the LAN diagnostics tool comprises a web server and a LAN Diagnostics Common Gateway Interface (CGI) application.

4. The method of claim 1, wherein the execution environment indicator indicates JAVA availability, the selected testing agent comprises a LAN diagnostics JAVA Applet, the LAN diagnostics tool further comprises a LAN diagnostics application executing on the CPE, and the testing further comprises the LAN diagnostics application communicating with the LAN diagnostics JAVA Applet being executed on the device.

5. The method of claim 4, wherein the plurality of tests comprise measuring the thru-put from the CPE to the device, measuring the thru-put from the device to the CPE, measuring a packet loss rate from the CPE to the device, measuring a packet loss rate from the device to the CPE, and measuring a round trip delay between the CPE and the device.

6. The method of claim 4, wherein the execution environment indicator indicates JAVA unavailability, the selected testing agent comprises a LAN diagnostics JavaScript, and the testing further comprises the LAN diagnostics tool communicating with the LAN diagnostics JavaScript being executed in a web browser disposed on the device.

7. The method of claim 1, wherein the execution environment indicator indicates a web browser, the selected testing agent comprises a LAN diagnostics JavaScript, and the testing further comprises the LAN diagnostics tool communicating with the LAN diagnostics JavaScript being executed in a web browser disposed on the device.

8. The method of claim 1, further comprising storing the test results on the CPE.

9. The method of claim 1, further comprising analyzing the test results to determine problems in the LAN and display possible solutions to the problems.

10. A system to test a Local Area Network (LAN) coupled to a satellite network through a Customer Premises Equipment (CPE), the system comprising:
a LAN diagnostics tool disposed on the CPE for executing a plurality of tests, wherein the LAN diagnostics tool sends a first script to determine an execution environment indicator; and
a test request, received at the LAN diagnostics tool, comprising an execution environment indicator, wherein the LAN diagnostics tool is configured to select a test agent comprising a second script based on the execution environment indicator, is configured to send the selected test agent, and is configured to test the LAN with communications between the LAN diagnostics tool and the selected test agent being executed, in an execution environment indicated by the execution environment indicator, on a device connected to the LAN, and the CPE couples the satellite network to the LAN, and the plurality of tests comprise measuring the thru-put from the CPE to the device, measuring the thru-put from the device to the CPE, measuring a packet loss rate from the CPE to the device, measuring a packet loss rate from the device to the CPE, and measuring a round trip delay between the CPE and the device.

11. The system of claim 10, further comprising a gateway between the satellite network and the LAN, wherein the gateway is disposed in the CPE.

12. The system of claim 10, wherein the LAN diagnostics tool comprises a web server and a LAN Diagnostics Common Gateway Interface (CGI) application.

13. The system of claim 10, wherein the execution environment indicator indicates JAVA availability, the selected testing agent comprises a LAN diagnostics JAVA Applet, the LAN diagnostics tool further comprises a LAN diagnostics application executing on the CPE, and the LAN diagnostics application tests by communicating with the LAN diagnostics JAVA Applet being executed on the device.

14. The system of claim 13, wherein the plurality of tests comprise measuring the thru-put from the CPE to the device, measuring the thru-put from the device to the CPE, measuring a packet loss rate from the CPE to the device, measuring a packet loss rate from the device to the CPE, and measuring a round trip delay between the CPE and the device.

15. The system of claim 13, wherein the execution environment indicator indicates JAVA unavailability, the selected testing agent comprises a LAN diagnostics JavaScript, and the LAN diagnostics tool tests by communicating with the LAN diagnostics JavaScript being executed in a web browser disposed on the device.

16. The system of claim 10, wherein the execution environment indicator indicates a web browser, the selected testing agent comprises a LAN diagnostics JavaScript, and the LAN diagnostics tool tests communicating with the LAN diagnostics JavaScript being executed in a web browser disposed on the device.

17. The system of claim 10, further comprising storing the test results on the CPE.

18. The system of claim 10, wherein the LAN diagnostics is configured to analyze the test results to determine problems in the LAN and is configured to display possible solutions to the problems.

* * * * *